US008559542B2

(12) United States Patent
Rietman et al.

(10) Patent No.: US 8,559,542 B2
(45) Date of Patent: *Oct. 15, 2013

(54) METHOD, A TRANSMITTING STATION, A RECEIVING STATION AND A PREAMBLE STRUCTURE FOR COMMUNICATING A SIGNAL USING ANALOG BEAM STEERING

(75) Inventors: Ronald Rietman, Eindhoven (NL); Ying Wang, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 254 days.

This patent is subject to a terminal disclaimer.

(21) Appl. No.: 12/863,229

(22) PCT Filed: Jan. 21, 2009

(86) PCT No.: PCT/IB2009/050216
§ 371 (c)(1),
(2), (4) Date: Jul. 16, 2010

(87) PCT Pub. No.: WO2009/093182
PCT Pub. Date: Jul. 30, 2009

(65) Prior Publication Data
US 2010/0290550 A1   Nov. 18, 2010

(30) Foreign Application Priority Data
Jan. 25, 2008   (EP) .................................... 08305010

(51) Int. Cl.
*H04B 7/02*   (2006.01)
(52) U.S. Cl.
USPC ........... 375/267; 375/260; 375/259; 375/219; 375/316; 375/295

(58) Field of Classification Search
USPC ................. 375/267, 260, 259, 219, 316, 295
See application file for complete search history.

(56) References Cited

U.S. PATENT DOCUMENTS

| | | | |
|---|---|---|---|
| 5,303,240 A | 4/1994 | Borras et al. | |
| 7,898,478 B2 * | 3/2011 | Niu et al. | 342/377 |
| 2003/0006933 A1 * | 1/2003 | Kasperkovitz et al. | 342/368 |
| 2005/0035894 A1 * | 2/2005 | Dean et al. | 341/155 |
| 2006/0140303 A1 * | 6/2006 | Egashira et al. | 375/299 |
| 2006/0233270 A1 * | 10/2006 | Ahn et al. | 375/260 |
| 2008/0240001 A1 * | 10/2008 | Struhsaker et al. | 370/280 |
| 2008/0247370 A1 | 10/2008 | Gu et al. | |
| 2009/0046798 A1 * | 2/2009 | Xia et al. | 375/267 |
| 2010/0069235 A1 | 3/2010 | Funk | |
| 2010/0183084 A1 * | 7/2010 | Rietman | 375/260 |

FOREIGN PATENT DOCUMENTS

| | | | |
|---|---|---|---|
| JP | 2007060479 A | 3/2007 | |
| JP | 2010511759 A | 4/2010 | |
| WO | 2007040515 A2 | 4/2007 | |
| WO | 2007095354 A2 | 8/2007 | |
| WO | 2008152566 A1 | 12/2008 | |

* cited by examiner

*Primary Examiner* — Kenneth Lam

(57) ABSTRACT

The present invention relates to a method for communicating a signal to a first station from a second station, the stations having antenna array. For communication in bands like 60 GHz, it is advisable to carry out analog beam steering. But it is needed to compute all the beam forming weights in a single message. Then, the invention-proposes that for each signal, in the preamble, a plurality of training symbols are included, wherein during each training symbol repetition, the receiving station adjusts at least one antenna parameter of the plurality of antennas and measuring the combined signal for computing a set of antenna weights to be applied for an analog beam forming on the antenna array for receiving and/or transmitting the data field.

14 Claims, 4 Drawing Sheets

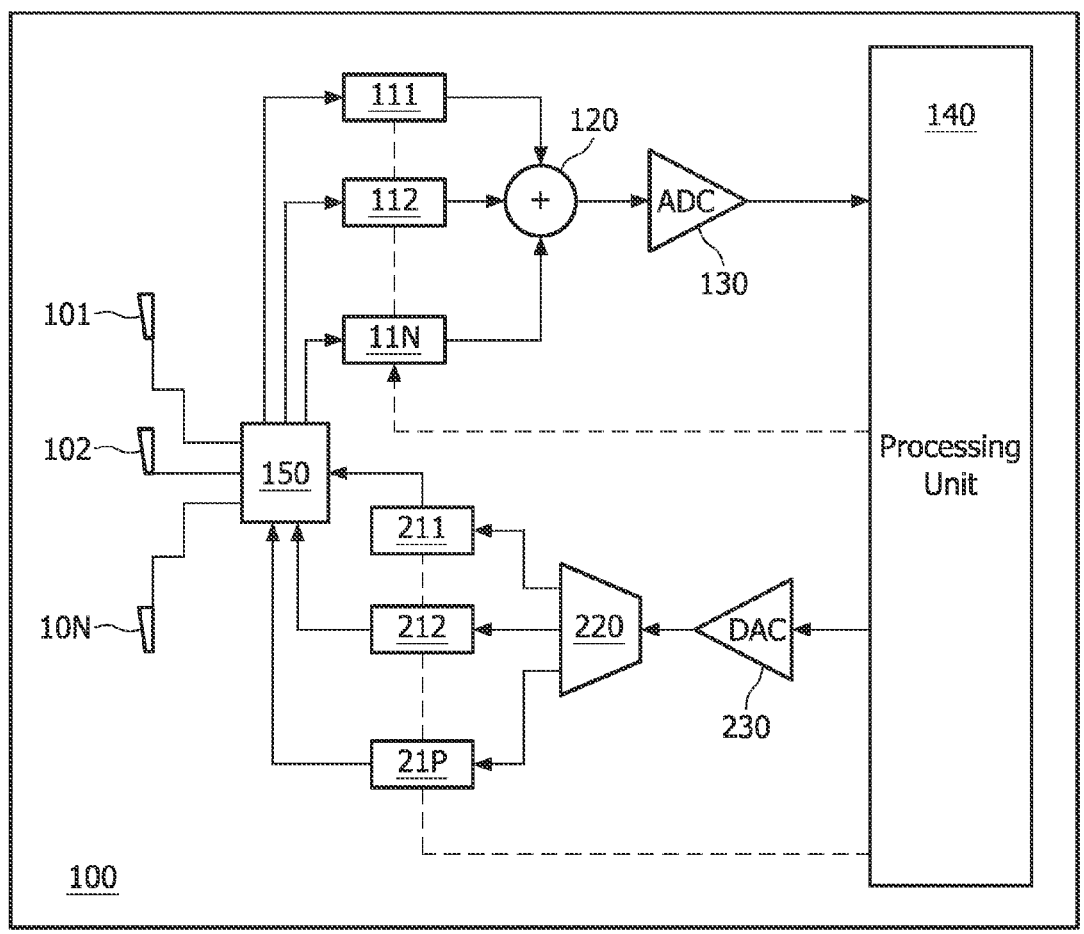
FIG. 1-I

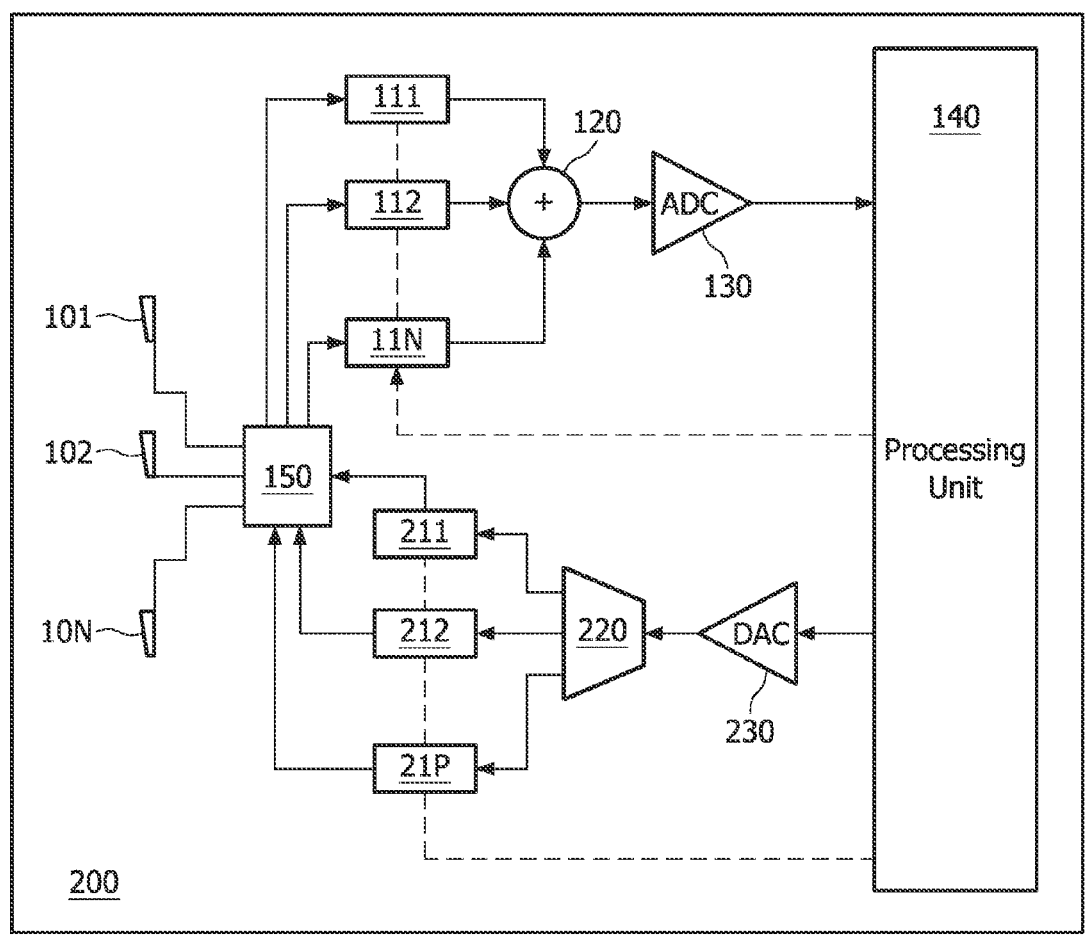
FIG. 1-II

METHOD, A TRANSMITTING STATION, A RECEIVING STATION AND A PREAMBLE STRUCTURE FOR COMMUNICATING A SIGNAL USING ANALOG BEAM STEERING

FIELD OF THE INVENTION

The present invention relates to a method for communicating a signal using analog beam forming, a transmitting station and a receiving station carrying out this method and a particular preamble structure used in this method.

This invention is relevant for wireless communication, with any transmission scheme, for instance OFDM, or similar, and is particular interesting for millimeter wave wireless communication (for instance, in the 60 GHz band).

BACKGROUND OF THE INVENTION

For some applications, as for instance millimeter-wave wireless communication which is based in the 60 GHz band, over a distance of more than a few meters, high-gain antennas are required in order to overcome link budget limitations.

Such high gain antennas may be obtained with an antenna array comprising a plurality of antennas or antenna elements, which the radiation beams can be steered electronically. The signal on each of these antennas is modified by means of an amplifier/attenuator and phase shifter or delay line. For a dynamic beam forming, gains of amplifiers and phases of phase shifter can be controlled and adjusted. This can be modelled with complex numbers, called weights, whose modulus (or absolute value) represents the gain to apply to an amplifier dedicated to a considered antenna, and whose argument represent the phase shift to apply to the phase shifter. The beam forming permits to modify the sensitivity pattern of the antenna array, in order to make it more directional, i.e. to increase the sensitivity along a particular direction, where the signal is supposed to be, and/or to reduce the sensitivity along a different direction, for instance with interference.

For certain applications that require high antenna gain, one may employ antennas comprising many elements. However, having a high speed analogue-to-digital converter for each individual antenna signal is prohibitive in terms of power consumption and processing requirements for the base band processor. Therefore, it is preferable to use analog beam forming, i.e. a receiving station architecture in which the antenna signals are modified in the analogue domain (phase shifted and amplitude multiplied), added, and only then digitized with a single analogue-to-digital converter. In some applications, the receiving station comprises a plurality of analogue to digital converters, each one being common to a plurality of antenna elements (possibly few, M, analogue-to-digital converters, with M<N=number of antenna elements). Similarly, in the transmitting station, a single digital signal (or a few digital signals) are converted to analogue and split over multiple antenna elements. The analogue signals on each of the elements can be modified individually, just like in the receiver.

However, As the receiving station has fewer A/D converters (M) than antenna elements (N) it can only perform M channel measurements simultaneously, whereas a full channel measurement would require N measurements.

SUMMARY OF THE INVENTION

It is an object of the invention to propose a method for communicating from a transmitting station to a receiving station allowing to train many antenna elements, using a single preamble.

It is another object of the invention to propose a method for configuring quickly an analogue beam forming.

To this end, the invention proposes a method for communicating a signal to a first station from a second station, said first station having an antenna array including a plurality of antennas, said method comprising the steps of:

(a) receiving on each antenna a respective analog signal having a configuration field and a data field, said configuration field comprising a training symbol repeated a plurality of times, (b) combining at least two analog signals into a combined signal, wherein during each training symbol repetition, adjusting at least one antenna parameter of the plurality of antennas and measuring the combined signal, and computing a set of antenna weights to be applied for an analog beam forming on the antenna array for receiving the data field.

As a consequence, with help of a single preamble, the receiving station, here the first station can perform more channel measurements by switching its beam forming weights when receiving different training symbols, and thus determine the best beam forming weights. Depending on the number of training symbols, it can even measure the signal for all antennas, and compute the optimal set of beam forming weights, and use them for receiving subsequent datagrams.

In an exemplary embodiment of the present invention, the configuration field comprises an indication of the number of repetitions of the training symbol. This number of symbol is, for example, predetermined.

In another example, the method comprises a preliminary step of signalling from the first station to the second station the number of antennas of the antenna array. In such a case, the number of repetitions is, for example, determined on the basis of the number of antennas of the first station.

The present invention also relates to a receiving station comprising an antenna array including a plurality of antennas, for receiving on each antenna a respective analog signal having a configuration field and a data field, said configuration field comprising a training symbol repeated a plurality of times, combining means for combining at least two analog signals into a combined signal, adjusting means for adjusting at least one antenna parameter of the plurality of antennas during each training symbol repetition, measuring means the combined signal obtained with each setting of the at least one parameter, and computing means for computing a set of antenna weights to be applied to the adjusting means for an analog beam forming on the antenna array for receiving the data field.

According another aspect of the invention, it is proposed a transmitting station for communicating with a receiving station according to a previous aspect of the invention, comprising transmitting means for transmitting an analog signal having a configuration field and a data field, said configuration field comprising a sequence of identical training symbols repeated a plurality of times, so that the receiving station can carry out a plurality of measurements with respective antenna settings for deducing an analog beam forming.

According to still a further aspect of the invention, a preamble structure is proposed, the preamble structure having a sequence of identical training symbols repeated a plurality of times, arranged so that a receiving station as claimed in accordance with the invention can carry out a plurality of measurements with respective antenna settings for deducing an analog beam forming.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIG. 1 is a block diagram representing schematically a system comprising two stations according to a first embodiment of the invention;

DETAILED DESCRIPTION OF THE INVENTION

Figure 2:
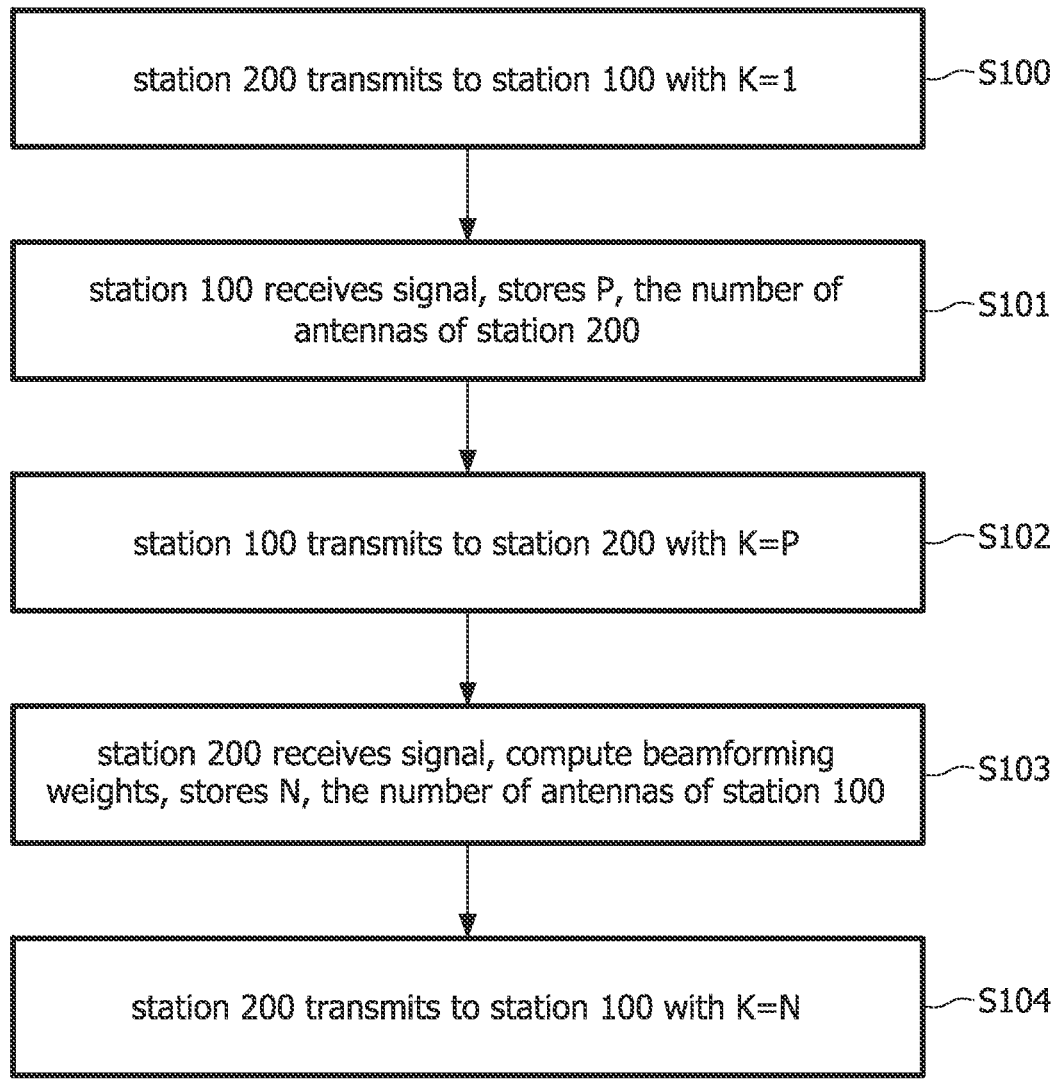
FIG. 2 is flow chart illustrating a method in accordance with an embodiment of the invention.

The present invention relates to a method for communicating in a system as illustrated on FIG. 1, having at least one first station 100, being able to receive signals, and at least one second station 200, being able to transmit signals. In general, and as illustrated on FIG. 1, each station of the system are able to both receive and transmit signals.

The first station 100 according to the invention comprises N antennas 101 to 10N, each being connected respectively to adjusting means 111 to 11N. These adjusting means may comprise amplifiers or attenuators for adjusting the gain of the received signal, and phase shifters or delay gates for adjusting the phase of their respective signals. In this example, these adjusting means 111 to 11N are analog, and are dynamically controlled by a processing unit 140. The adjusting means supply a signal to a combining means 120, for instance an adder as illustrated on FIG. 1. The adder 120 outputs a combined analog signal which is then digitized by an Analog to Digital Converter (ADC) 130 into a digital signal. The processing unit 140 receives the digital signal for carrying out measurements and for processing it. In a variant of the invention, the station 100 may comprise a plurality of Analog to digital converters 130, each being common to an antenna sub set of the antenna array.

As illustrated, the first station 100 is also able to transmit signals, with the same antenna array. Switching means 150 permits to switch from a receiving mode to a transmitting. In the transmitting mode, the transmit chain of station 100 is connected to the antenna array by the switching means 150. The transmit chain has a symmetrical structure when compared with the receive chain previously described. In the transmitting mode, each antenna 101 to 10N are connected respectively to adjusting means 211 to 21P. These adjusting means 211 to 21P may be analog and may be similar to the adjusting means of the receive chain. The processing unit 140 may control dynamically the antennas. This processing unit may generate firstly a digital signal to be sent to the second station. This digital signal may be converted into an analog signal by an Digital to Analogue Converter 230, and then the signal is copied by a demultiplexing means 220, and supplied to each adjusting means 211 to 21P and transmitting antennas T1 to TP.

The second station 200 has a similar structure and will not be described in further details hereafter.

As illustrated on FIG. 1, all the stations may comprise means for both transmitting and receiving signals, for instance by using the same antenna arrays, switched from a receive chain when receiving to a transmit chain when transmitting.

Figure 3:
FIG. 3 is time chart representing a signal comprising a preamble structure in accordance with an embodiment of the invention.

When communicating to each other, the stations 100 and 200 use a signal having a preamble depicted on FIG. 3. This preamble comprises a plurality of training symbols, noted L. A L-symbol is a predetermined waveform a receiver can use to estimate the channel, for instance in a single-antenna system. Indeed, a receiving station as station 100 can adjust some antenna parameters with the adjusting means, and measure the signal with these parameters. Thus, it can try several different antenna settings, and compute beam forming weights from the results. A S-symbol is another training symbol, transmitted by the transmitter, which the receiver can use to perform synchronisation (defined analogously to the long and the short preamble in 802.11).

In a beam forming system in accordance with the invention, the transmitting station transmits packets with the structure of FIG. 3, where the total number of L symbols is either fixed by the standard to a suitable number, e.g., 1, 2, 4 or 137. In this case the indicator field may be absent, or variable, in which case their number is signalled in the indicator field. The indicator field may be transmitted using the same modulation as the signal field (low data rate), so it has the highest probability of being correctly decodable. To allow for many training symbols, at least one full octet may be provided (taking values 0, . . . , 255) so it makes sense to let this number indicate the number of L-symbols that follows the indicator field. The total number of L symbols may be one more if a first L-symbol, just following the synchronisation symbol, is provided so that the receiving station can test its current beamforming weights. The remaining octets in the indicator field can be used for other purposes, e.g., to indicate to the receiver the number of L symbols the transmitter wants to receive from the receiver later on, when their roles as transmitter and receiver are reversed.

Here the symbol (signal field) is transmitted using a fixed coding & modulation method. In it, the transmitting station encodes what the coding & modulation method it uses in the data symbols that follow it.

Due to the number of L-symbols, the receiving station can perform channel measurements by switching its beam forming weights when receiving different L-symbols, and thus determine the best beam forming weights. This is described in more detail below.

For two stations, like station 100 and station 200, that both use the same antennas for transmitting as for receiving, as in FIG. 1, channel reciprocity implies that the weights that are optimal for station 100 to receive from station 200 are also optimal for station 100 to transmit to station 200. If the stations use different antennas to transmit and to receive, the channels are non-reciprocal due to differences in the transmit and receive chains. But, since these differences can be measured and calibrated by known methods, channel reciprocity may be ensured by use of this calibration.

In accordance with a first embodiment of method of the invention, and assuming channel reciprocity of the station, when a station, for instance station 200 starts a communication with the station 100, it may first of all transmits a first signal using an omnidirectionnal transmission pattern. Moreover, if initially the stations 100 and 200 know neither their optimal beam forming weights nor each other's number of antenna elements, the transmitting station 100 will send its first packet at a low data rate and using transmit beam forming weights $V^{(1)}$ that correspond to a fairly omni-directional radiation pattern, i.e. no direction of transmission is preferred, at step S100 on FIG. 2. As shown on FIG. 3, in an indicator field 320 of the signal, the station 200 indicates its number of antenna elements, P, and how many training symbols, noted as L-symbols on FIG. 3, it is transmitting. Since station 200 doesn't know the number of antenna elements, N, the receiving station 100 has, it must choose a number of L-symbols arbitrarily. In the first step S100, station 200 can choose K=1.

At step S101, the station 100 receives this packet with a first set of beam forming weights $W^{(1)}$. Since it only receives K=1 training symbols, the station 100 cannot do any optimisation yet. Station 100 responds, at step S102, with a packet transmitted using beam forming weights $W^{(1)}$ and containing P L-symbols, it may also indicate in the indicator field that it has N antenna elements. Station 100 may choose to transmit less L-symbols, and it can also choose a somewhat higher data rate for the data symbols of this packet, since station 200 will be able to do receiver beam forming during reception at step S103. Let $V^{(2)}$ denote the resulting beam forming weights.

Station 200 then transmits its second packet with for instance N L-symbols and using beam forming weights $V^{(2)}$, at step S104. The data symbols can be transmitted at a higher rate, since station 100 is now doing transmit beam forming and station 200 should be able to do receive beam forming during reception of station 200's second packet. Indeed, station 100 knows that N L-symbols will follow. Then, for each L symbol, it can adjust its adjusting means to a respective setting and measure the received signal, for instance by measuring the quality of the signal (CQI measurements, Signal to Noise Ratio measurements, etc. . . . ). By doing that, it can then compute beam forming weights. The result of station 100's beam forming is $W^{(2)}$. Then, station 100 responds again with a packet transmitted with beam forming weights $W^{(2)}$, etc.

An example of the computation carried out is as follows. If the base band signal on the n-th antenna element is denoted by X(n) and the complex number (beam forming weight) corresponding to that antenna element is W(n), then the received signal is:

$$R = \sum_{n=1}^{N} W(n)X(n)$$

where N is the number of antenna elements of the receiving station, for instance station 100.

If the preamble contains K L-symbols, the receiver measures the received signal (after the A-D converter) for K different antenna settings. If the beam forming weight corresponding to the k-th antenna setting and the n-th element is denoted by $W_k(n)$ and the base band signal on the n-th antenna element during reception of an L-symbol is X(n), then the received signal during the k-th L-symbol is $$R_k = \sum_{n=1}^{N} W_k(n)X(n).$$

Immediately after reception of $R_1, \ldots, R_K$ the receiver calculates $$\alpha_k = \frac{(R_k)^*}{\sum_{n=1}^{N} |W_k(n)|^2},$$

which it will use for the beam forming weights $$W(n) = \sum_{k=1}^{K} \alpha_k W_k(n)$$

during reception of the data symbols in the packet. In this above example, it is assumed the weights $W_k(n)$ are orthogonal.

It is advisable for the transmitting station to transmit one more L-symbol, so that the receiving station can also do a channel measurement with the calculated beam forming weights W. (This extra symbol is not needed when K=1.) These weights gives the optimal beam forming weights in the space spanned by $W_1, \ldots, W_K$, i.e. the beam forming giving the highest signal-to-noise ratio) If K=N and $W_1, \ldots, W_N$ are linearly independent, the resulting beam forming weights are optimal. The receiver is free to choose $W_1, \ldots, W_K$.

If the channel is stable, the beam forming weights $V^{(i)}$ and $W^{(i)}$ converge quickly to limiting values. The stations may then choose to ask for fewer L-symbols than their respective number of antenna elements (e.g. only 1), since no further optimisation is needed. If the channel conditions change, they may again ask for more L-symbols. At each iteration, the station is free to choose the basis vectors it uses during the K channel measurements. It is advisable to let the first basis vector be equal to the calculated optimal vector from the previous step.

In a variant of the invention, a first station indicates a bit rate to be used by the other station in a next transmission signal. The bit rate may be selected in dependence upon the set of computed antenna weights. For instance, if the computed antenna weights are not fine enough, since the number of L-symbols was too low for testing all the possible settings, the first station will indicate an intermediary data rate rather than a high data rate.

In another variant of the invention, the transmitting station, for instance station 200 may transmit more L-symbols than the number of antennas of the receiving station 100. For example, it can transmit Q L-symbols, where Q=N×P. This can be used for testing both transmitting and receiving antenna settings. The station 200 may transmit the L-symbols with different antenna settings, varying with a predetermined period, for instance T, being equal to the duration of N L-symbol. The station 100 receives the L-symbol with different antenna settings, for instance varying every L-symbol.

The settings change may be carried out so that each station changes less frequently. For example, if both stations 100 and 200 have the same number of antennas, they can change their respective settings every two L-symbol, but out-phased, for example in quadrature relative to each other.

Then, the receiving station 100 can compute the transmit antenna weights and the receive antenna weights and transmit at least the transmit antenna weights to the station 200, so that the latter can use them in a next transmission.

Figure 4:
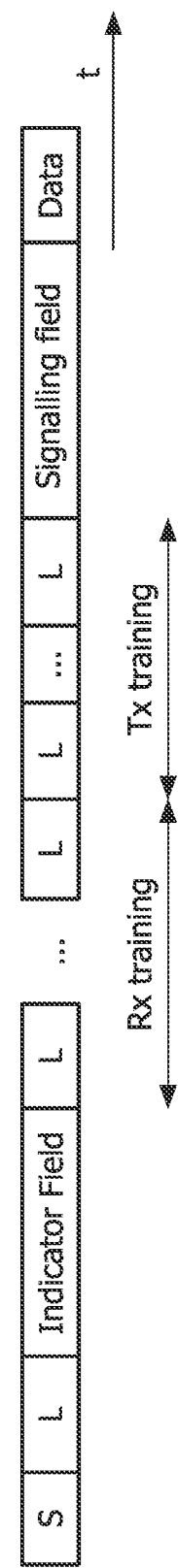
FIG. 4 is time chart representing a signal comprising a preamble structure in accordance with another embodiment of the invention.

In another embodiment of the invention, the transmitting station sends a sequence of Q L-symbols, where for instance Q=N+P. This can be used for testing both transmitting and receiving antenna settings. As can be seen on FIG. 4, during the N first L-symbols forming the receive training phase (Rx training), the transmitting station may transmit the L-symbols with its current optimal antenna setting (at the first transmission an omnidirectional antenna setting can be chosen), and during the P last L-symbols forming the transmit training phase (Tx training), the transmitting station may transmit the L-symbols with different varying antenna settings. On the receiving side, during the N first L-symbols of the receive training phase, the receiving station may receive the L-symbols with different varying antenna settings, and during the P last L-symbols of the receive training phase, the receiving station may receive the L-symbols with its current optimal antenna setting. The receiving station can calculate the beamforming weights that the transmitting station should use to maximize the received signal power. Then, in a next message, the receiving station can feed back these weights to the transmitting station.

The antenna settings during the transmit training phase may be selected on the basis of several criterion. For instance, each L-symbol may be multiplied with different transmission weights Tk (i.e., the k-th column of a specified training matrix T). In fact, each antenna element n of the antenna array is adjusted by means the coefficients T(n,k) of the training matrix where T(n,k) is the transmit weight of n-th antenna element in the transmission of the k-th training L-symbol. A Hadamard matrix can be used can be used for instance.

It is to be noted that it is particularly advantageous to use a matrix with orthonormal columns, since this enables to assist the receiving station processing of the weights. Indeed, if columns of the matrix are not orthonormal, then the receiver must have knowledge of this matrix prior to the reception. However, orthonormal columns create patterns radiating in all directions, creating thus interference for other neighboring terminals. It is thus proposed to use a Fourier matrix.

A N×K Fourier matrix F is defined as follows:
Each coefficient $$F(n, k) = \exp\left(-j2\pi\left(\frac{k_1 n_1}{K_1} - \frac{k_2 n_2}{K_2}\right)\right),$$

n=0, . . . , N−1, k=0, . . . , K−1 N=N1*N2, K=K1*K2, K1>=N1, K2>=N2
n1=n mod N1, n1=0, . . . , N1−1, n2=floor(n/N1), n2= 0, . . . , N2−1.

In an example of this embodiment, the antenna array comprises N elements arranged in a rectangular N2×N1. In such a case, each one of the K columns of F corresponds to a beam pointing to a certain direction, i.e., K determines the beam pointing resolution.

The main advantage of a Fourier matrix is that such it is easy to signal to the receiving station the required parameters to construct the matrix.

According to a variant of this embodiment, two different operating modes are distinguished. During a discovery mode, which can be carried out on a specific discovery channel at a low rate and with an omnidirectionnal pattern, a full Fourier matrix can be chosen, i.e. K1=N1 and K2=N2. It is then required to signal only N1 and N2 to the receiving station. In the discovery mode, the two stations do not know each other and which beamforming is optimal. The transmitting station sends a frame as explained above with a sequence of Q L-symbols, where for instance Q=N+P. When an optimal beamforming is computed after this discovery mode, the two stations can switch to another channel, like a data channel, and may start communicating with a higher data rate.

During this communication, it is required to maintain an optimal beamforming. Thus, the stations enter into a tracking mode. In this tracking mode, in the preamble of at least some messages, some training symbols are provided. It may not be useful to provide as many training symbols as in the discovery phase, since an optimal beamforming is deemed to be known. These training symbols are used to test some beamforming weights around the current optimal beamforming. In an example of this embodiment, the transmitting station uses a matrix equal to current beamforming vector pointwise multiplied with specified columns of a Fourier matrix. This gives suitable patterns with lobes close to the current pattern. The columns used are signaled so that the receiving station knows the current training matrix and can do more advanced processing to obtain a better estimate of new optimal transmit weights.

For instance, the tracking mode matrix can be chosen with a small array size, e.g. K1=N1*4, K2=N2*4 for small array size, or K1=N1, K2=N2 for large array size. Then, the training matrix: use the selected 4 (or 8) columns from a Fourier matrix, size N×4 (or N×8). It is only required to signal N1, N2, K1, K2 to ensure better estimates of the weights.

It is possible to choose a reduced Fourier matrix, with only a limited number of lobes around the current optimal beamforming weight. For example, select columns from F for beam tracking
Tracking beam: wopt.*F(:,k1k2).
Current optimum beam: (k1,k2)=(0,0).
The closest 4 beams: (k1,k2)=(0,1), (0,K2−1), (1,0), (K1−1,0).
The next closest 4 beams: (k1,k2)=(1,1), (1,K2−1), (K1−1,1), (K1−1,K2−1).

It is to be noted that according to another embodiment of the invention, the preambles in discovery mode and/or tracking mode may comprise only a transmit training phase (and no receive training phase), i.e. a sequence of L-symbols during which the transmitting station adjusts the beamforming weights according to a Fourier matrix. A feedback is then needed by the receiving station.

The structure of the preamble can be used no matter what transmission scheme (e.g., OFDM, single carrier, single carrier block transmission or some other method) is used.

This method permits to ensure the computation of beam forming weights without requiring feed back transmission to the other station. Moreover, in a single preamble, the stations are able to obtain the optimal beam forming weights, and can adapt these weights at every transmission of data.

In the present specification and claims the word "a" or "an" preceding an element does not exclude the presence of a plurality of such elements. Further, the word "comprising" or "comprise" does not exclude the presence of other elements or steps than those listed. The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communications and which may be used instead of or in addition to features already described herein.

The invention claimed is:

1. A method for communicating a signal to a first station from a second station, said first station having an antenna array including a plurality of antennas, said method comprising the steps of:
    (a) receiving at the first station on each antenna a respective analog signal having a configuration field and a data field, said configuration field comprising a sequence of K training symbols repeated N times in a single broadcast, where K corresponds to the number of transmit antenna settings and N corresponds to the number of receiver antenna settings,
    (b) combining at least two analog signals into a combined signal, wherein during each training symbol repetition, adjusting at least one antenna parameter of the plurality of antennas and measuring the combined signal, and
    (c) computing a set of antenna weights to be applied for an analog beam forming on the antenna array for receiving the data field.

2. The method of claim 1, wherein he combined signal is digitized before being measured.

3. The method of claim 1, wherein the antenna parameters comprises the phase and the amplitude of each antenna signal.

4. The method of claim 1, wherein the second station comprises a transmitting antenna array having a plurality of transmitting antennas, and the method further comprising at the second station adjusting at least one antenna parameter of the second station of the plurality of transmitting antennas during each training symbol repetition, at the first station computing a set of transmitting antenna weights and a set of receiving antenna weights, at the first station, sending to the second station the set of transmitting antenna weights to be used during the next transmission.

5. The method of claim 1, wherein the second station comprises a transmitting antenna array having a plurality of transmitting antennas, the method comprising at the second station initiating the communication with the receiving station using an omnidirectional radiation pattern.

6. The method of claim 1, wherein the first station indicates a bit rate to be used by the second station in a next transmission signal, said bit rate being selected in dependence upon the signal quality of the combined signal.

7. The method of claim 1, wherein the first station transmits at least one parameter of the Fourier matrix so that the second station is able to build the Fourier matrix on the basis of this at least one parameter.

8. A receiving station comprising:
   an antenna array including a plurality of antennas, for receiving on each antenna a respective analog signal having a configuration field and a data field, said configuration field comprising a sequence of K training symbol repeated N times in a single broadcast, where K corresponds to the number of transmit antenna settings and N corresponds to the number of receiver antenna settings,
   combining means for combining at least two analog signals into a combined signal, adjusting means for adjusting at least one antenna parameter of the plurality of antennas during each training symbol repetition,
   measuring means the combined signal obtained with each setting of the at least one parameter, and
   computing means for computing a set of antenna weights to be applied to the adjusting means for an analog beam forming on the antenna array for receiving the data field.

9. A transmitting station for communicating with a receiving station as claimed in claim 8, comprising transmitting means for transmitting an analog signal having a configuration field and a data field, said configuration field comprising a sequence of identical training symbols repeated a plurality of times, so that the receiving station can carry out a plurality of measurements with respective antenna settings for deducing an analog beam forming.

10. A method for communicating a signal from a first station to a second station, said first station having an antenna array including a plurality of antennas, said method comprising the steps of:
   (a) at the first station transmitting by means of the antenna array a combined signal formed by the combination of respective analog signals corresponding to each antenna of the antenna array, said respective analog signals having a configuration field, said configuration field comprising a sequence of K training symbol repeated N times in a single broadcast, where K corresponds to the number of transmit antenna settings and N corresponds to the number of receiver antenna settings, wherein said transmitting step comprises the sub-step of adjusting at least one antenna parameter of each antenna of the plurality of antennas during each training symbol repetition in accordance with a training matrix based on a Fourier matrix, and
   (b) at the second station receiving the combined signal, measuring at least one parameter corresponding to each training symbol, and signaling an indication based on the measured parameters to the first station,
   (c) at the first station computing from the indication based on the measured parameters a set of transmit antenna weights.

11. The method of claim 10, wherein the training matrix is obtained by pointwise multiplying a previously computed optimal set of transmit antenna weights with at least one column of a Fourier matrix.

12. The method of claim 10, wherein the indication based on the measured parameters is obtained by calculating beamforming weights on the basis of the measured parameters of the symbols.

13. The method of claim 10, wherein the steps are repeated until an optimal set of beamforming weights is found, and the communication between the first station and the second station is switched to a different channel once the optimal set beamforming weights has been found.

14. A radio station comprising means for communicating a signal to a further radio station, said radio station comprising:
   an antenna array including a plurality of antennas,
   means for transmitting by means of the antenna array a combined signal formed by the combination of respective analog signals corresponding to each antenna of the antenna array, said respective analog signals having a configuration field, said configuration field comprising a a sequence of K training symbol repeated N times in a single broadcast, where K corresponds to the number of transmit antenna settings and N corresponds to the number of receiver antenna settings,
   means for adjusting at least one antenna parameter of each antenna of the plurality of antennas during each training symbol repetition in accordance with a training matrix based on a Fourier matrix,
   means for receiving an indication based on measured parameters from the further radio station, said measured parameters corresponding to each training symbol,
   means for computing from the indication based on the measured parameters a set of transmit antenna weights.

* * * * *